(12) United States Patent
Wu

(10) Patent No.: US 11,224,305 B2
(45) Date of Patent: Jan. 18, 2022

(54) METHOD AND DEVICE FOR ADJUSTING INDOOR ILLUMINATION INTENSITY

(71) Applicant: BEIJING XIAOMI MOBILE SOFTWARE CO., LTD., Beijing (CN)

(72) Inventor: Ke Wu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 322 days.

(21) Appl. No.: 16/186,485

(22) Filed: Nov. 10, 2018

(65) Prior Publication Data
US 2019/0142202 A1 May 16, 2019

(30) Foreign Application Priority Data
Nov. 13, 2017 (CN) .......................... 201711117745.6

(51) Int. Cl.
*A47H 5/02* (2006.01)
*H04L 12/28* (2006.01)
(Continued)

(52) U.S. Cl.
CPC ............. *A47H 5/02* (2013.01); *A47H 5/0325* (2013.01); *E06B 9/32* (2013.01); *G05B 19/042* (2013.01);
(Continued)

(58) Field of Classification Search
CPC .. A47H 5/02; A47H 2005/025; A47H 5/0325; E06B 2009/6827; G09G 5/10;
(Continued)

(56) References Cited

U.S. PATENT DOCUMENTS 10,462,878 B2 * 10/2019 Wang ....................... H04N 5/60
2013/0061258 A1 3/2013 Takaya
(Continued)

FOREIGN PATENT DOCUMENTS

CN 105159022 A 12/2015
CN 105549409 A 5/2016
(Continued)

OTHER PUBLICATIONS

First Office Action issued to Japanese Patent Application No. 2018-528031 dated Jan. 31, 2020 with English translation, (8p).
(Continued)

*Primary Examiner* — Jerry E Redman
*Assistant Examiner* — Abe Massad
(74) *Attorney, Agent, or Firm* — Arch & Lake LLP

(57) ABSTRACT

The present disclosure relates to a method and a device for adjusting indoor illumination intensity. In the method, a target illumination intensity value is acquired when a target electric appliance is running and the target electric appliance is susceptible to illumination intensity in a room. In the method, a first indoor illumination intensity value in the room is collected, and an indoor illumination intensity adjustment device is controlled according to the first indoor illumination intensity value and the target illumination intensity value. The indoor illumination intensity adjustment device is controlled to change the first indoor illumination intensity value to achieve a second indoor illumination intensity value where the second indoor illumination intensity value conforms to the target illumination intensity value.

9 Claims, 8 Drawing Sheets

(51) Int. Cl.
  *G09G 5/10* (2006.01)
  *E06B 9/32* (2006.01)
  *A47H 5/032* (2006.01)
  *G05B 19/042* (2006.01)
(52) U.S. Cl.
  CPC ........... *G09G 5/10* (2013.01); *H04L 12/2827* (2013.01); *A47H 2005/025* (2013.01); *G09G 2360/144* (2013.01)
(58) Field of Classification Search
  CPC .......... G09G 2360/144; H04L 12/2827; G05B 19/042
  See application file for complete search history.

(56) References Cited

U.S. PATENT DOCUMENTS

| | | | |
|---|---|---|---|
| 2015/0089551 A1* | 3/2015 | Bruhn | H04N 21/4131 725/80 |
| 2015/0091473 A1* | 4/2015 | Clavenna, II | H05B 47/105 315/297 |
| 2015/0160626 A1* | 6/2015 | Cregg | E06B 9/24 700/275 |
| 2015/0225999 A1* | 8/2015 | Berman | E06B 9/68 315/149 |
| 2015/0368967 A1* | 12/2015 | Lundy | E06B 9/68 160/5 |
| 2016/0040478 A1* | 2/2016 | Lundy | E06B 9/68 700/275 |
| 2016/0278188 A1* | 9/2016 | Karc | H05B 47/11 |
| 2016/0295662 A1* | 10/2016 | Hyde | H05B 47/155 |
| 2017/0191687 A1 | 7/2017 | Wu | |

FOREIGN PATENT DOCUMENTS

| | | |
|---|---|---|
| CN | 205285918 U | 6/2016 |
| CN | 105807644 A | 7/2016 |
| CN | 106274392 A | 1/2017 |
| CN | 206093986 U | 4/2017 |
| CN | 106802574 A | 6/2017 |
| CN | 106847230 A | 6/2017 |
| CN | 107175675 A | 9/2017 |
| CN | 107912953 A | 4/2018 |
| EP | 2851894 A1 | 3/2015 |
| JP | S60138998 U | 9/1985 |
| JP | S62082194 A | 4/1987 |
| JP | H05334863 A | 12/1993 |
| JP | 200917354 A | 1/2009 |
| KR | 1019920021097 A | 12/1992 |

OTHER PUBLICATIONS

International Search Report and Written Opinion (including English translations) issued in PCTCN2018082883, dated Jul. 30, 2018, 19 pages.
Chinese Office Action (including English translation) issued in CN201711117745.6, dated 3 Mar. 11, 2019, 15 pages.
European Office Action issued in EP18206020.2, dated Mar. 26, 2019, 7 pages.
Chinese Office Action issued in CN201711117745.6, dated Aug. 30, 2019, with English translation (17p).
Korean Office Action issued to KR 10-2019-703794, dated Sep. 4, 2019 with English translation (7p).

* cited by examiner

METHOD AND DEVICE FOR ADJUSTING INDOOR ILLUMINATION INTENSITY

CROSS REFERENCE TO RELATED APPLICATION

This application is based upon and claims a priority to Chinese Patent Application Serial No. 201711117745.6, filed with the State Intellectual Property Office of P. R. China on Nov. 13, 2017, the entire content of which is incorporated herein by reference in its entirety.

TECHNICAL FIELD

The present disclosure relates to the field of automatic control technologies, and more particularly, to a method and a device for adjusting indoor illumination intensity.

BACKGROUND

When an image is displayed using a display device of an electronic device in a room, the quality of the displayed image on the display devices may be affected by the environment light intensity. To achieve a high display quality, there may be a need for the user to adjust a curtain of the room based on the current electrical device to control the indoor illumination intensity, particularly to control the illumination intensity that affects the display quality of the display device. For example, when the user is watching a liquid crystal television, the self-illumination brightness of the liquid crystal television is high and the indoor illumination intensity has small impact on the quality of display on the liquid crystal television, the user may not need to close the curtains. However, when the user is viewing an image by using a projector, where the project has the low self-light intensity comparing to the liquid crystal television, the user may need to close the curtain when watching the image displayed by using the projector.

SUMMARY

The present disclosure provides a method, a device and a non-transitory computer-readable medium for adjusting indoor illumination intensity.

A method for adjusting indoor illumination intensity is provided. The method may include: acquiring a target illumination intensity value when a target electric appliance is running where the target electric appliance that is running is susceptible to illumination intensity in a room; collecting a first indoor illumination intensity value in the room; and controlling an indoor illumination intensity adjustment device according to the first indoor illumination intensity value and the target illumination intensity value to change the first indoor illumination intensity value to achieve a second indoor illumination intensity value in the room, where the second indoor illumination intensity value conforms to the target illumination intensity value.

An apparatus for adjusting indoor illumination intensity is provided. The apparatus may include: a processor; and a memory configured to store executable instructions by the processor; where the processor may be configured to: acquire a target illumination intensity value when a target electric appliance is running where the target electric appliance that is running is susceptible to illumination intensity in a room, collect a first indoor illumination intensity value in the room, and control an indoor illumination intensity adjustment device according to the first indoor illumination intensity value and the target illumination intensity value to change the first indoor illumination intensity value to achieve a second indoor illumination intensity value in the room, where the second indoor illumination intensity value conforms to the target illumination intensity value.

A non-transitory computer readable storage medium having instructions stored thereon is provided. When the instructions are executed by a processor, the instruction may cause the process to execute: acquiring a target illumination intensity value when a target electric appliance is running, where the target electric appliance that is running is susceptible to illumination intensity in a room; collecting a first indoor illumination intensity value in the room; and controlling an indoor illumination intensity adjustment device according to the first indoor illumination intensity value and the target illumination intensity value to change the first indoor illumination intensity value to achieve a second indoor illumination intensity value in the room, where the second indoor illumination intensity value conforms to the target illumination intensity value.

It is to be understood that both the foregoing general description and the following detailed description are exemplary and explanatory only and are not restrictive of the disclosure.

BRIEF DESCRIPTION OF THE DRAWINGS

The accompanying drawings herein are incorporated in and become parts of the specification, illustrate examples consistent with the disclosure and, together with the description, serve to explain the principles of the disclosure.

DETAILED DESCRIPTION

Examples disclosed herein are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of devices and methods consistent with aspects related to the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
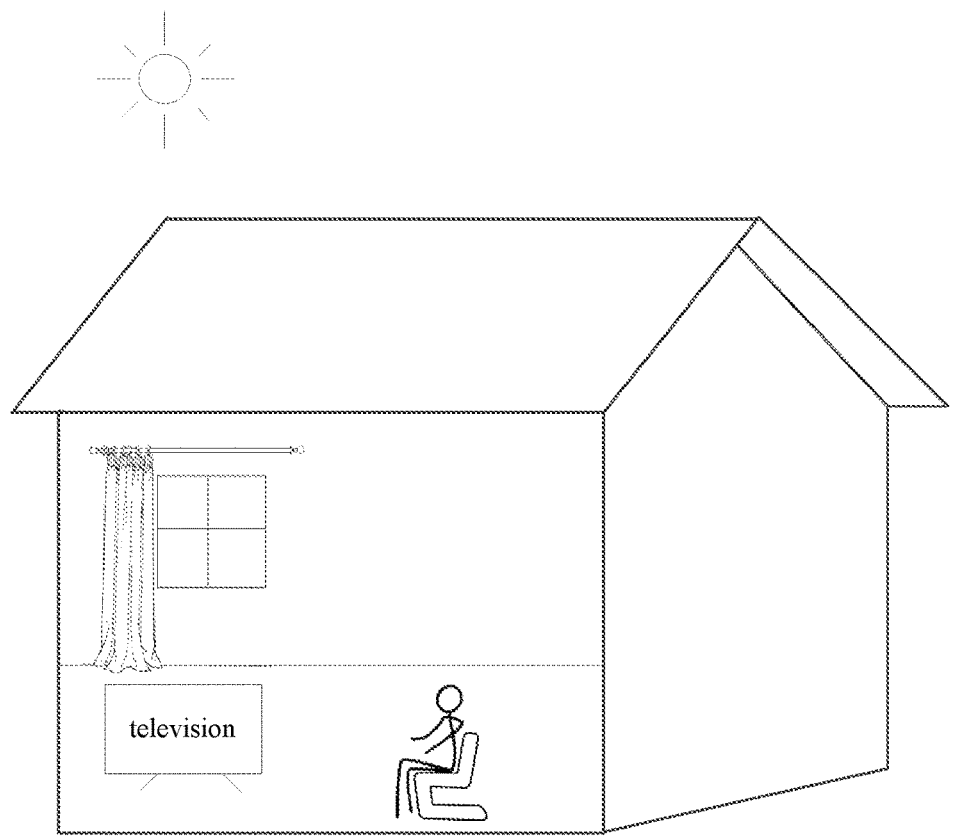
FIG. 1 is a diagram illustrating a scenario where a method of the present disclosure is applied according to an example.

Generally, requirements for illumination intensity are different from one electric appliance to another. As illustrated in FIG. 1, a target electric appliance that may be affected by the illumination intensity in a room is a television. When the user is watching the television, upon a condition that an indoor light intensity value does not conform to the requirement of the illumination intensity of the television, the user may need to manually adjust a curtain to be an open or a closed status. As a result, the manual operation by the user costs time and effort, causing the poor user experience. Furthermore, the user adjusts the opened-closed status of the curtain according to experience, so that the indoor illumination intensity value cannot bring a best effect of video viewing.

Figure 2:
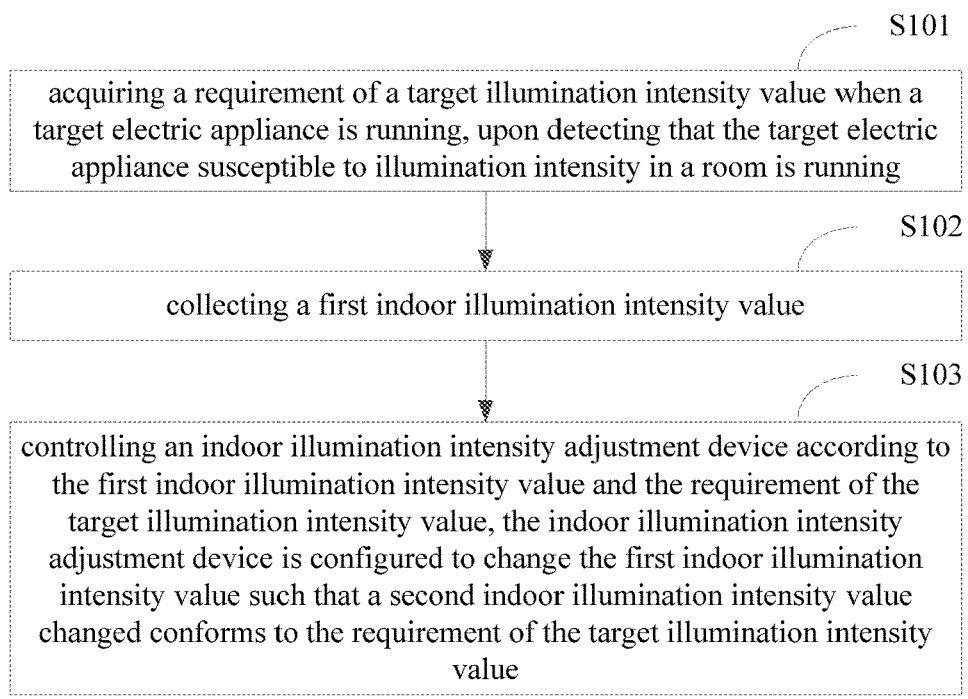
FIG. 2 is a flow chart illustrating a method for adjusting indoor illumination intensity according to example One.

In order to solve the above technical problems, on the basis of the scenario diagram illustrated in FIG. 1, examples of the present disclosure provide a method for adjusting indoor illumination intensity. As illustrated in FIG. 2, the method includes blocks S101-S103.

In block S101, upon detecting that a target electric appliance susceptible to illumination intensity in a room is running, a requirement of a target illumination intensity value when the target electric appliance is running is acquired.

In block S102, a first indoor illumination intensity value is collected.

In block S103, an indoor illumination intensity adjustment device is controlled according to the first indoor illumination intensity value and the requirement of the target illumination intensity value. The indoor illumination intensity adjustment device is configured to change the first indoor illumination intensity value such that a second indoor illumination intensity value changed conforms to the requirement of the target illumination intensity value.

Each type of the electric appliance in the room has a respective best requirement of the target illumination intensity value. In other words, under a situation that the requirement of the target illumination intensity value is satisfied, the effect of video viewing via the electric appliance is best.

When it is detected that the target electric appliance easily affected by the illumination intensity is running in the room, in order to achieve a better effect of video viewing, the requirement of the target illumination intensity value when the target electric appliance is running may be acquired, and the indoor illumination intensity value may be acquired, so as to control the indoor illumination intensity adjustment device according to the indoor illumination intensity value and the target illumination intensity value. The illumination intensity adjustment device is configured to change the indoor illumination intensity value such that the indoor illumination intensity value conforms to the requirement of the target illumination intensity value, thereby achieving the better effect of video viewing.

As an example, the above-mentioned indoor illumination intensity value may be acquired via a light intensity sensor. The above blocks S101 and S103 may be executed via a controller.

The indoor illumination intensity adjustment device includes, but not limited to, an indoor illumination device, a curtain, a window or the like. The indoor illumination intensity value may include at least one of the illumination intensity value of light irradiated from outside to the room, the illumination intensity value of the indoor illumination device, or the illumination intensity value of other light-emitting devices, which is not limited in the present disclosure.

As an example, when the indoor illumination intensity adjustment device is the window, the above adjustment process may be implemented as follows. A light transmittance of the window is adjusted according to the indoor illumination intensity value and the requirement of the target illumination intensity value, such that the indoor illumination intensity value conforms to the requirement of the target illumination intensity value.

Technical solutions provided in examples of the present disclosure may include following beneficial effects. By acquiring the requirement of the target illumination intensity value when the target electric appliance is running, upon detecting that the target electric appliance susceptible to illumination intensity in the room is running, and by collecting the indoor illumination intensity value, the indoor illumination intensity adjustment device that is configured to change the indoor illumination intensity value is controlled according to the indoor illumination intensity value and the requirement of the target illumination intensity value, such that the indoor illumination intensity value conforms to the requirement of the target illumination intensity value. The indoor illumination intensity adjustment device may be automatically controlled based on the acquired requirement of the target illumination intensity value and the collected indoor illumination intensity value, such that the indoor illumination intensity value conforms to the requirement of the target illumination intensity value, thereby effectively improving an effect of video viewing via the target electric appliance.

When the indoor illumination intensity adjustment device includes the curtain, the above block S103 may be implemented as following blocks a1-a3.

In block a1, it is detected whether the indoor illumination intensity value is greater than the target illumination intensity value.

In block a2, when it is detected that indoor illumination intensity value is greater than the target illumination intensity value, the curtain is controlled to be closed according to a predetermined rule.

In block a3, during a process of closing the curtain, an adjusted indoor illumination intensity value is detected. When it is detected that the adjusted indoor illumination intensity value conforms to the requirement of the target illumination intensity value, the curtain is controlled to remain in a current status. Conforming to the requirement of the target illumination intensity value is that the adjusted illumination intensity value is not greater than the requirement of the target illumination intensity value.

During a process of controlling the curtain, since different comparison results correspond to different adjustment strategies, the comparison result between the indoor illumination intensity value and the target illumination intensity value may be detected. When it is detected that the indoor illumination intensity value is greater than the target illumination intensity value, it needs to decrease the illumination intensity. As a result, the curtain may be controlled to be closed according to the predetermined rule. During the process of closing the curtain, the adjusted indoor illumination intensity value may be detected in real time. When it is detected that the indoor illumination intensity value is not greater than the target illumination intensity value, the curtain is controlled to remain in the current status.

Sometimes, it may firstly calculate which closed status the curtain is in when the indoor illumination intensity value is in conformity with the requirement of the target illumination intensity value, such that the curtain is directly controlled to be closed to that calculated closed status.

Figure 3:
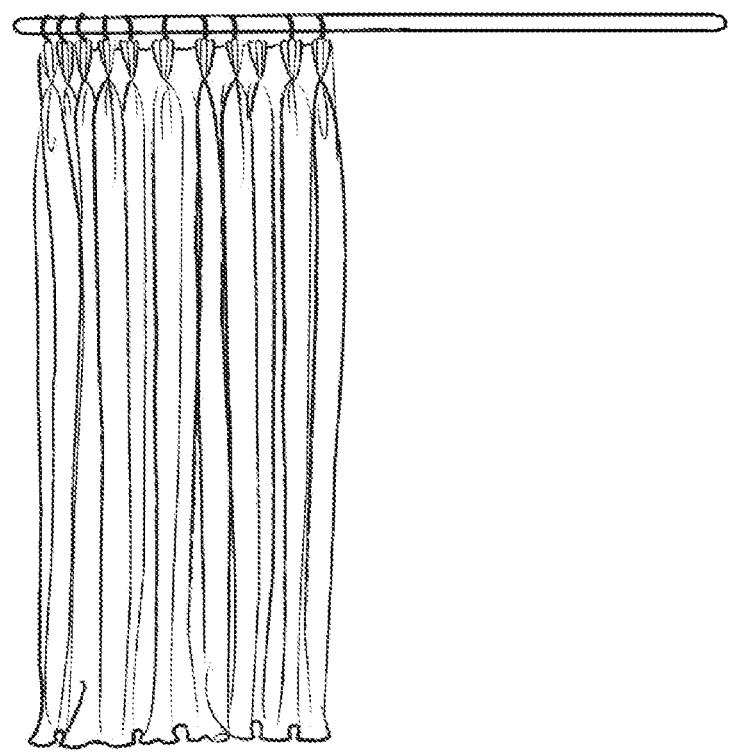
FIG. 3 is a schematic diagram illustrating a curtain according to example One.
Figure 4:
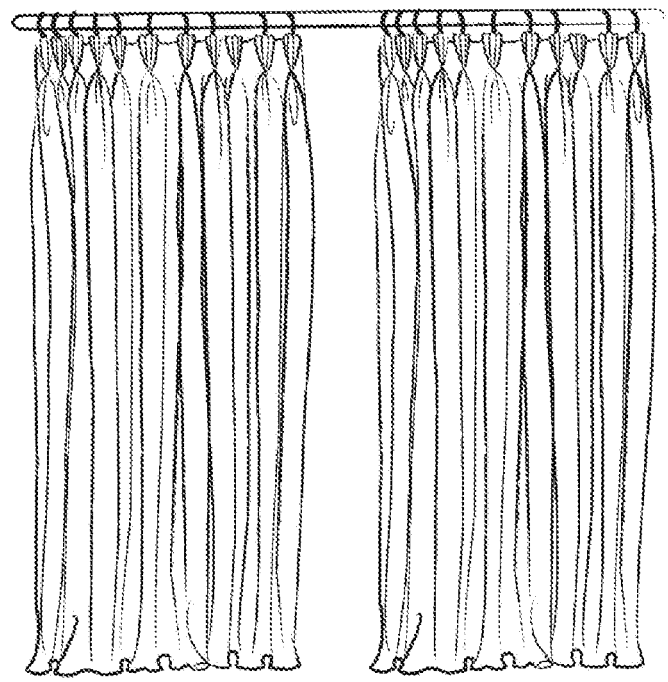
FIG. 4 is a schematic diagram illustrating a curtain according to example One.
Figure 5:
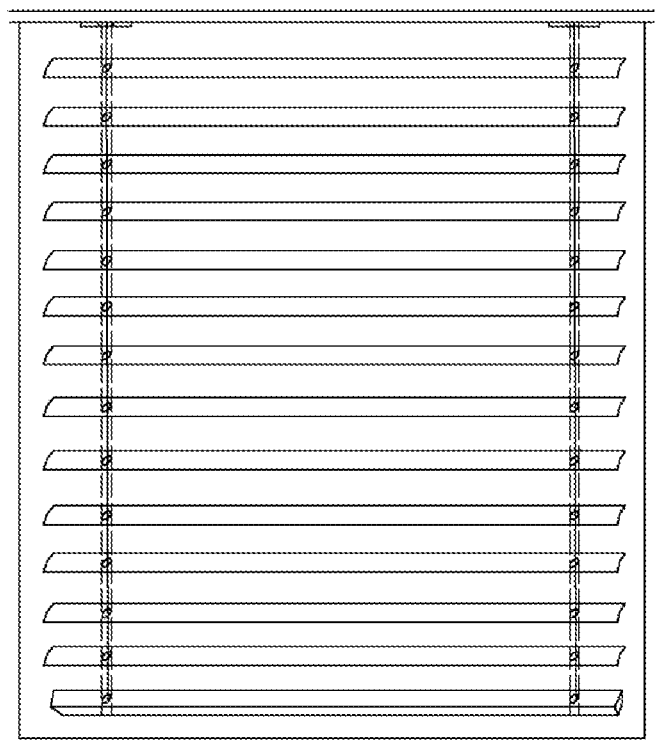
FIG. 5 is a schematic diagram illustrating a curtain according to example One.

The type of the curtain includes, but not limited to, the type illustrated in FIG. 3, the type illustrated in FIG. 4, the type illustrated in FIG. 5 and other types. The types of the curtain are not limited in the present disclosure.

Controlling to close the curtain based on the predetermined rule may include, but not limited to, the followings. Taking the curtain illustrated in FIG. 3 as an example, the curtain is controlled to be closed towards right at a preset closing speed. Taking the curtain illustrated in FIG. 4 as an example, two pieces of curtain are controlled to be closed simultaneously towards middle at a preset closing speed; alternatively, a piece of curtain left-positioned is controlled to be closed firstly towards right at a preset closing speed, and then the other piece of curtain right-positioned is controlled to be closed towards left at a preset closing speed. Taking the curtain illustrated in FIG. 5 as an example, each component of the curtain which is for example a louver is controlled to be closed at a preset closing speed in an order from upper to lower; alternatively, the curtain is controlled to be fallen at a preset closing speed. It is to be noted that, how to close the curtain is not limited in the present disclosure.

As an example, the above blocks a1-a3 may also be executed via the above controller. The curtain may be controlled to be closed via a processor of the curtain, which is not limited in the present disclosure.

Technical solutions provided in examples of the present disclosure may include following beneficial effects. The opened-closed status of the curtain is determined according to the indoor illumination intensity value and the requirement of the target illumination intensity value, thereby effectively adjusting the indoor illumination intensity value to conform to the requirement of the target illumination intensity value.

In an example, when the indoor illumination intensity adjustment device further includes the indoor illumination device, the above block a3 may be implemented as follows.

During the process of closing the curtain, the adjusted indoor illumination intensity value is detected. When the curtain is in a fully closed status where the curtain is fully closed, upon detecting that the indoor illumination intensity value does not conform to the requirement of the target illumination intensity value, luminosity parameters of the indoor illumination device are adjusted, such that the adjusted indoor illumination intensity value conforms to the requirement of the target illumination intensity value.

After the curtain is in the fully closed status, it is possible that the indoor illumination intensity value is still greater than the target illumination intensity value. Therefore, the luminosity parameters of the indoor illumination device in the room may be further adjusted. For example, luminosity of the indoor illumination device is reduced, such that the indoor illumination intensity value is adjusted to be the target illumination intensity value. By this way, even though the indoor illumination intensity value is still greater than the target illumination intensity value, the indoor illumination device may be adjusted to achieve the good result image viewing quality.

The above process of adjusting the luminosity parameters of the indoor illumination device includes the followings. The luminosity of the indoor illumination device may be reduced based on a preset adjustment speed. During the reduction of the luminosity, the indoor illumination intensity value is detected in real time. When it is detected that the indoor illumination intensity value is the target illumination intensity value, the luminosity of the indoor illumination device is controlled to remain as the current luminosity. Alternatively, an adjustment value for the luminosity of the indoor illumination device may be determined according to the indoor illumination intensity value and the target illumination intensity value, such that the luminosity of the indoor illumination device is directly adjusted based on the adjustment value to make the indoor illumination intensity value equal to the target illumination intensity value.

Technical solutions provided in examples of the present disclosure provide following beneficial effects. After the curtain is fully closed, when the indoor illumination intensity value still does not conform to the requirement of the target illumination intensity value, the indoor illumination intensity value may be effectively adjusted to conform to the requirement of the target illumination intensity value by further adjusting the luminosity of the indoor illumination device.

In an example, the above-mentioned method further includes blocks b1-b2.

In block b1, when it is detected that the indoor illumination intensity value is smaller than the target illumination intensity value, the curtain is controlled to be opened according to a predetermined rule.

In block b2, during a process of opening the curtain, an adjusted indoor illumination intensity value is detected. When it is detected that the adjusted indoor illumination intensity value is in conformity with the requirement of the target illumination intensity value, the curtain is controlled to remain in a current status. In conformity with the requirement of the target illumination intensity value is that the adjusted indoor illumination intensity value is not smaller than the requirement of the target illumination intensity value.

When it is detected that the indoor illumination intensity value is smaller than the target illumination intensity value, the curtain needs to be opened to increase the indoor illumination intensity value. Therefore, the curtain may be controlled to be opened based on the predetermined rule. During the process of opening the curtain, the adjusted indoor illumination intensity value may be detected in real time. When it is detected that the indoor illumination intensity value is not smaller than the target illumination intensity value, the curtain is controlled to remain in the current status.

Sometimes, it may also calculate which opened status the curtain is in when the indoor illumination intensity value conforms to the requirement of the target illumination intensity value, such that the curtain may be directly controlled to be opened in accordance with that calculated opened status.

As an example, the above blocks b1 and b2 may also be executed via the above controller. The curtain may be controlled to be opened via its own processor of the curtain, which is not limited in the present disclosure.

The type of the curtain may include, but not limited to, the type illustrated in FIG. 3, the type illustrated in FIG. 4, the type illustrated in FIG. 5, and other types, which are not limited in the present disclosure.

Controlling to open the curtain based on the predetermined rule may include, but not limited to, the followings. Taking the curtain illustrated in FIG. 3 as an example, the curtain is controlled to be opened towards left at a preset opening speed. Taking the curtain illustrated in FIG. 4 as an example, two pieces of curtain are controlled to be opened simultaneously towards sides at a preset opening speed; alternatively, a piece of curtain left-positioned is controlled to be opened firstly towards left at a preset opening speed, and then the other piece of curtain right-positioned is controlled to be opened towards right at a preset opening speed. Taking the curtain illustrated in FIG. 5 as an example, each component of the curtain which is for example a louver is controlled to be opened at a preset opening speed in an order from upper to lower; alternatively, the curtain is controlled to be pulled up at a preset opening speed. It is to be noted that, how to open the curtain is not limited in the present disclosure.

Technical solutions provided in examples of the present disclosure may include following beneficial effects. The opened-closed status of the curtain is determined according to the indoor illumination intensity value and the requirement of the target illumination intensity value, such that the indoor illumination intensity value may be effectively adjusted to conform to the requirement of the target illumination intensity value.

In above examples, conforming to the requirement of the target illumination intensity value is that the adjusted indoor illumination intensity value equals to the requirement of the target illumination intensity value.

In an example, the indoor illumination intensity adjustment device further includes an indoor illumination device. The above block b2 may be implemented as follows.

During the process of opening the curtain, the adjusted indoor illumination intensity value is detected. When the curtain is in a fully opened status that the curtain is fully opened, upon detecting that the adjusted indoor illumination intensity value is smaller than the target illumination intensity value, luminosity parameters of the indoor illumination device are adjusted, such that the adjusted indoor illumination intensity value conforms to the requirement of the target illumination intensity value.

After the curtain is in the fully opened status, it is possible that the indoor illumination intensity value is still smaller than the target illumination intensity value. Therefore, the luminosity parameters of the indoor illumination intensity device in the room may be further adjusted. For example, luminosity of the indoor illumination device is increased, such that the indoor illumination intensity value may conform to the requirement of the target illumination intensity value.

Adjusting the luminosity parameters of the indoor illumination device includes the following. The luminosity of the indoor illumination device may be increased at a preset adjustment speed. During increase of the luminosity, the indoor illumination intensity value is detected in real time. When it is detected that the indoor illumination intensity value conforms to the requirement of the target illumination intensity value, the luminosity of the indoor illumination device is controlled as the current luminosity. Alternatively, an adjustment value for the luminosity of the indoor illumination device may be determined according to the indoor illumination intensity value and the target illumination intensity value. Therefore, the luminosity of the indoor illumination device is directly adjusted based on the adjustment value, such that the indoor illumination intensity value conforms to the requirement of the target illumination intensity value.

Technical solutions provided in examples of the present disclosure may include following beneficial effects. After the curtain is fully opened, when the indoor illumination intensity value is still smaller than the target illumination intensity value, the luminosity of the indoor illumination device may be further adjusted, such that the indoor illumination intensity value may be effectively adjusted to conform to the requirement of the target illumination intensity value.

In an example, when the indoor illumination intensity adjustment device includes the indoor illumination device, the luminosity parameters of the indoor illumination device may be directly adjusted according to a relationship between the indoor illumination intensity value and the target illumination intensity value to make the indoor illumination intensity value in conformity with the requirement of the target illumination intensity value. When the luminosity parameters of the indoor illumination device are adjusted to upper limit or lower limit and the indoor illumination intensity value is still different from the target illumination intensity value, the opened-closed status of the curtain may be further adjusted, so as to make the indoor illumination intensity value in conformity with the target illumination intensity value.

In an example, the above block S101 may be implemented as blocks c1-c3.

In block c1, one or more electric appliances that are running in the room are acquired.

In block c2, when it is detected that an electric appliance included in the one or more electric appliances running in the room is same with one of candidate electric appliances included in a target adjustment table, the electronic appliance included in the one or more electric appliances running in the room that is same with one of the candidate electric appliances included in the target adjustment table is determined as a target electric appliance. The target adjustment table includes a mapping relationship between the candidate electric appliances and requirements of the target illumination intensity value required when the candidate electric appliances are running.

In block c3, the requirement of the target illumination intensity value corresponding to the target electric appliance is acquired from the target adjustment table.

The one or more electric appliances that are running in the room may be acquired via a controller. The controller may exchange information with electric appliances placed in the room to acquire the one or more electric appliances running in the room. For example, when an electric appliance in the room is running, the electric appliance may initiatively send a notification message to the controller. The notification message is used to inform that the electric appliance is running. Therefore, the controller may acquire one or more electric appliances running the in room.

Since there may be a plurality of electric appliances running in the room, and not all of the plurality of electric appliances running is susceptible to the illumination intensity, the plurality of the electric appliances running in the room may be screened to determine the target electric appliance that is susceptible to the illumination intensity. Further, on the basis of the requirement of the target illumination intensity value corresponding to this type of the target electric appliance, the indoor illumination intensity value is adjusted.

A target adjustment table may be preset in advance. The target adjustment table includes a mapping relationship between various candidate electric appliances and the requirements of the target illumination intensity value when the candidate electric appliances are running. After the one or more electric appliances running in the room are acquired, one electric appliance same with the one of the one or more electric appliances running in the room is retrieved from the candidate electric appliances included in the target adjustment table. The retrieved electric appliance is determined as the target electric appliance. Further, the requirement of the target illumination intensity value corresponding to the target electric appliance is acquired from the target adjustment table.

In an example, the target adjustment table is illustrated as Table 1. In Table 1, two candidate electric appliances are included, a television and a projector. The requirement of the target illumination intensity value corresponding to the television is target illumination intensity value A, while the requirement of the target illumination intensity value corresponding to the projector is target illumination intensity value B. When the acquired electric appliances running in the room include the television, a refrigerator and a washer, based on the electric appliances running in the room, after searching from the candidate electric appliances included in Table 1, it is determined that the target electric appliance is the television. Therefore, the requirement of the target illumination intensity value corresponding to the television is acquired from Table 1 as the target illumination intensity value A.

TABLE 1

| candidate electric appliances | requirement of target illumination intensity value |
| --- | --- |
| television | target illumination intensity value A |
| projector | target illumination intensity value B |

In another example, the target adjustment table is illustrated as Table 2. Two candidate electric appliances are included in Table 2, a television and a projector. The requirement of the target illumination intensity value corresponding to the television is being equal to the target illumination intensity value A, while the requirement of the target illumination intensity value corresponding to the projector is being not greater than the target illumination intensity value B.

TABLE 2

| candidate electric appliances | requirement of target illumination intensity value |
| --- | --- |
| television | equal to target illumination intensity value A |
| projector | not greater than target illumination intensity value B |

For example, when the acquired electric appliances running in the room include the television, the refrigerator and the washer, based on the electric appliances running in the room, after searching from the candidate electric appliances included in Table 2, it is determined that the target electric appliance is the television. Therefore, the requirement of the target illumination intensity value corresponding to the television is acquired from Table 2 as being equal to the target illumination intensity value A. Further, the indoor illumination intensity value may be collected, and the above block S103 may be implemented as follows. The indoor illumination intensity adjustment device is controlled according to the indoor illumination intensity value and the requirement of the target illumination intensity value, such that the indoor illumination intensity value is equal to the target illumination intensity value A.

It is to be noted that, the above processes of determining the target illumination intensity value may be achieved via a local controller, or may be achieved via a server. When the above processes are achieved via the server, information of the acquired electric appliances running in the room is required to be sent to the server, which is not limited in the present disclosure.

Technical solutions provided in examples of the present disclosure may include following beneficial effects. By determining the target electric appliance and the requirement of the target illumination intensity value corresponding to the target electric appliance through the target adjustment table, efficiency of adjusting the indoor illumination intensity may be improved.

In an example, the above target adjustment table may be obtained based on mage data. When the target adjustment table is obtained based on mage data, the number of candidate electric appliances included in the target adjustment table may be greater than the number of the electric appliances in the room, thereby costing more time to determine the target electric appliance through the target adjustment table. In order to reduce the time required for determining the target electric appliance through the target adjustment table, the above method further includes blocks d1-d4.

In block d1, a preset adjustment table is acquired. The preset adjustment table includes all electric appliances susceptible to the illumination intensity and the requirements of the target illumination intensity value corresponding to all electric appliances.

In block d2, all indoor electric appliances placed in the room are acquired.

In block d3, one or more candidate electric appliances that are contained in the preset adjustment table are detected in all indoor electric appliances.

In block d4, the target adjustment table is acquired according to the one or more candidate electric appliances and the preset adjustment table.

Above processes of acquiring the target adjustment table may be achieved via a local controller, or may be achieved via a server. When the above processes are achieved via the server, the processes are not limited in the present disclosure.

The above preset adjustment table may be obtained based on mega data. The preset adjustment table includes all electric appliances that are easily affected by the illumination intensity and the requirements of the target illumination intensity value corresponding to all electric appliances. After the preset adjustment table is obtained, all indoor electric appliances placed in the room are acquired. One or more electric appliance included in all indoor electric appliances placed in the room and contained in the preset adjustment table are detected, and the requirements of the target illumination intensity value corresponding to the detected one or more electric appliances are obtained. Therefore, the target adjustment table is built based on the one or more electric appliances included in the preset adjustment table and the requirements of the target illumination intensity value corresponding to the one or more electric appliances included in the preset adjustment table.

Technical solutions provided in examples of the present disclosure may include following beneficial effects. The target adjustment table only containing the indoor electric appliances placed in the room is built, such that the efficiency of acquiring the requirement of the target illumination intensity value from the target adjustment table may be increased.

Figure 6:
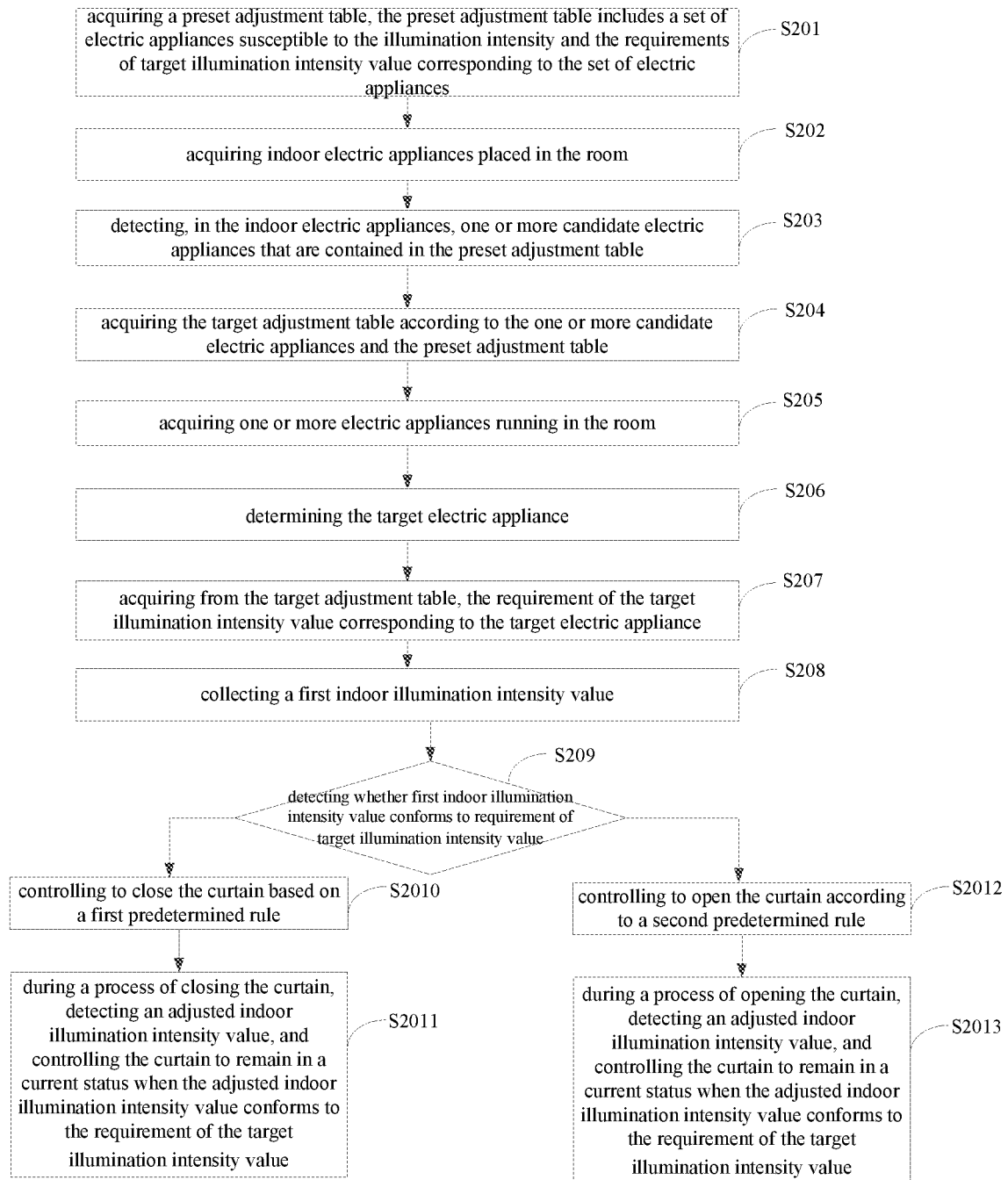
FIG. 6 a flow chart illustrating a method for adjusting indoor illumination intensity according to example Two.

FIG. 6 is a flow chart illustrating a method for adjusting indoor illumination intensity according to example Two. As illustrated in FIG. 6, the method includes the followings.

In block S201, a preset adjustment table is acquired. The preset adjustment table includes all electric appliances susceptible to the illumination intensity and the requirements of the target illumination intensity value corresponding to all electric appliances.

In block S202, all indoor electric appliances placed in the room are acquired.

In block S203, one or more candidate electric appliances that are contained in the preset adjustment table and included in all indoor electric appliances placed in the room are detected.

In block S204, a target adjustment table is acquired according to the one or more the candidate electric appliances and the preset adjustment table.

In block S205, one or more electric appliances in the room that are running are acquired.

In block S206, when it is detected that an electric appliance included in the one or more electric appliances running in the room is same with one of the candidate electric appliances of the target adjustment table, the electric appliances included in the electric appliances running in the room that is same with one of the candidate electric appliances of the target adjustment table is determined as the target electric appliance. The target adjustment table includes a mapping relationship between the candidate electric appliances and the requirement of the target illumination intensity value required when the candidate electric appliances are running.

In block S207, the requirement of the target illumination intensity value corresponding to the target electric appliance is acquired from the target adjustment table.

In block S208, an indoor illumination intensity value is collected.

In block S209, it is detected whether the indoor illumination intensity value is greater than the target illumination intensity value. When it is detected that the indoor illumination intensity value is greater than the target illumination intensity value, blocks S2010-S2011 are executed. When it is detected that the indoor illumination intensity value is smaller than the target illumination intensity value, blocks S2012-S2013 are executed.

In block S2010, a curtain is controlled to be closed according to a predetermined rule.

In block S2011, during a process of closing the curtain, an adjusted indoor illumination intensity value is detected. When it is detected that the adjusted indoor illumination intensity value is not greater than the requirement of the target illumination intensity value, the curtain is controlled to remain in a current status.

In block S2012, the curtain is controlled to be opened.

In block S2013, during a process of opening the curtain, the adjusted indoor illumination intensity value is detected. When it is detected that the adjusted indoor illumination intensity value equals to the requirement of the target illumination intensity value, the curtain is controlled to remain in a current status.

Below are examples of a device according to the present disclosure, for executing examples of the method according to the present disclosure.

Figure 7:
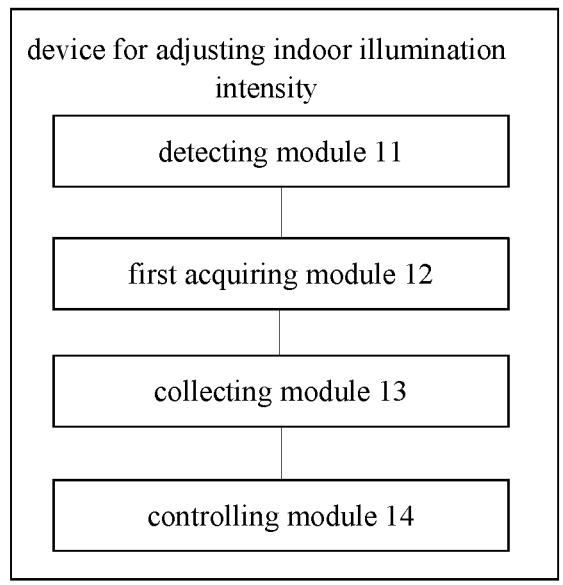
FIG. 7 is a block diagram illustrating a device for adjusting indoor illumination intensity according to example One.

FIG. 7 is a block diagram illustrating a device for adjusting illumination intensity according to an example. The device may be implemented as part or all of an electronic device through software, hardware, or a combination thereof. As illustrated in FIG. 7, the device for adjusting indoor illumination intensity includes a detecting module 11, a first acquiring module 12, a collecting module 13 and a controlling module 14.

The detecting module 11 is configured to detect whether a target electric appliance susceptible to illumination intensity in a room is running.

The first acquiring module 12 is configured, upon detecting by the detecting module 11 that the target electric appliance susceptible to the illumination intensity in the room is running, to acquire a requirement of a target illumination intensity value when the target electric appliance is running.

The collecting module 13 is configured to collect a first indoor illumination intensity value.

The controlling module 14 is configured to control an indoor illumination intensity adjustment device according to the first indoor illumination intensity value collected by the collecting module 13 and the requirement of the target illumination intensity value acquired by the first acquiring module 12. The indoor illumination intensity adjustment device is configured to change the first indoor illumination intensity value such that a second indoor illumination intensity value changed conforms to the requirement of the target illumination intensity value.

Figure 8:
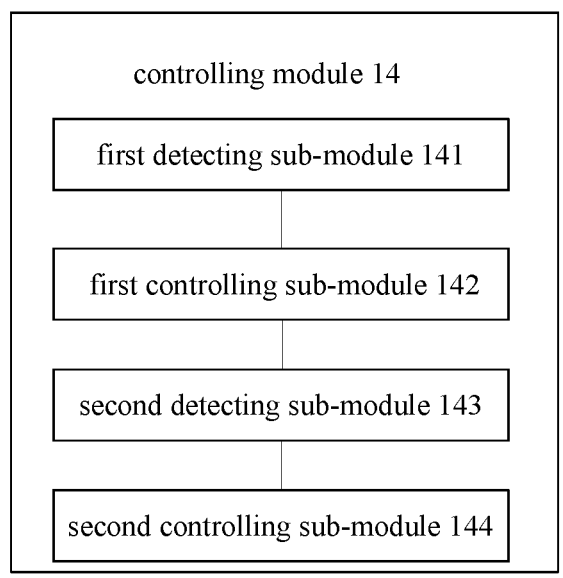
FIG. 8 is a block diagram illustrating a controlling module 14 included in a device for adjusting indoor illumination intensity according to example One.

In an example, as illustrated in FIG. 8, the indoor illumination intensity adjustment device includes a curtain. The controlling module 14 includes a first detecting sub-module 141, a first controlling sub-module 142, a second detecting sub-module 143, and a second controlling sub-module 144.

The first detecting sub-module 141 is configured to detect whether the first indoor illumination intensity value collected by the collecting module 13 is greater than the target illumination intensity value.

The first controlling sub-module 142 is configured to control to close the curtain according to a first predetermined rule when it is detected by the first detecting sub-module 141 that the first indoor illumination intensity value is greater than the target illumination intensity value.

The second detecting sub-module 143 is configured to detect an adjusted indoor illumination intensity value during a process of closing the curtain.

The second controlling sub-module 144 is configured to control the curtain to remain in a current status when it is detected by the second detecting sub-module 143 that the adjusted indoor illumination intensity value conforms to the requirement of the target illumination intensity value. Conforming to the requirement of the target illumination intensity value is that the adjusted indoor illumination intensity value is not greater than the requirement of the target illumination intensity value.

Figure 9:
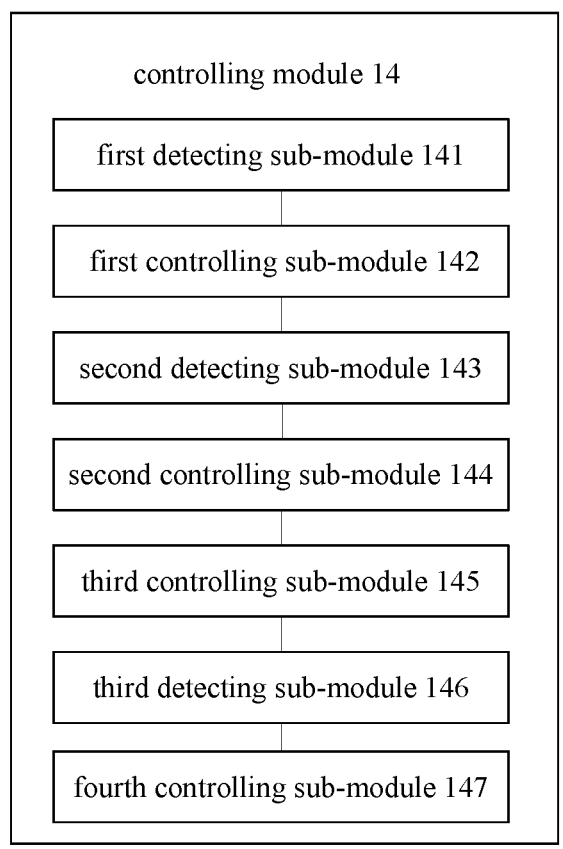
FIG. 9 is a block diagram illustrating a controlling module 14 included in a device for adjusting indoor illumination intensity according to example Two.

In an example, as illustrated in FIG. 9, the controlling module 14 further includes a third controlling sub-module 145, a third detecting sub-module 146, and a fourth controlling sub-module 147.

The third controlling sub-module 145 is configured to control to open the curtain according to a second predetermined rule when it is detected by the first detecting sub-module 141 that the first indoor illumination intensity value is smaller than the target illumination intensity value The third detecting sub-module 146 is configured to detect an adjusted indoor illumination intensity value during a process of opening the curtain.

The fourth controlling sub-module 147 is configured to control the curtain to remain in a current status when it is detected by the third detecting sub-module 146 that the adjusted indoor illumination intensity value conforms to the requirement of the target illumination intensity value. Conforming to the requirement of the target illumination intensity value is that the adjusted indoor illumination intensity value is not smaller than the requirement of the target illumination intensity value.

Figure 10:
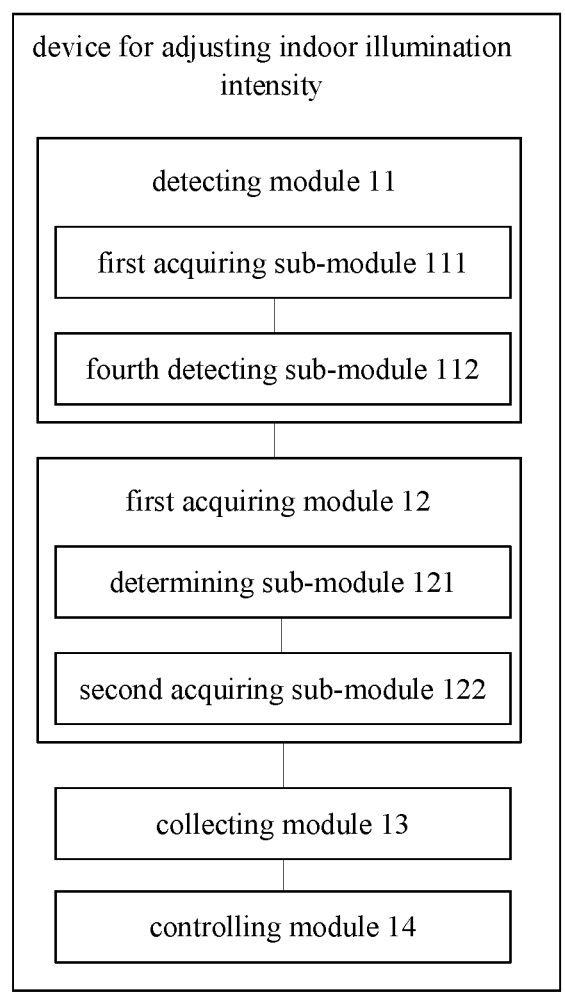
FIG. 10 is a block diagram illustrating a device for adjusting indoor illumination intensity according to example Two.

In an example, as illustrated in FIG. 10, the detecting module 11 includes a first acquiring sub-module 111 and a fourth detecting sub-module 112; and the first acquiring module 12 includes a determining sub-module 121 and a second acquiring sub-module 122.

The first acquiring sub-module 111 is configured to acquire one or more electric appliances running in the room.

The fourth detecting sub-module 112 is configured to detect whether an electric appliance, included in the one or more electric appliances running in the room acquired by the first acquiring sub-module 111, is same with one of candidate electric appliances included in a target adjustment table.

The determining sub-module 121 is configured, when it is detected by the fourth detecting sub-module 112 that an electrical appliance included in the one or more electric appliances running in the room is same with one of candidate electric appliances included in a target adjustment table, to determine the electric appliance as the target electric appliance. The target adjustment table includes a mapping relationship between the candidate electric appliances and requirements of target illumination intensity value when the candidate electric appliances are running.

The second acquiring sub-module 122 is configured to acquire from the target adjustment table, the requirement of the target illumination intensity value corresponding to the target electric appliance acquired by the determining sub-module 121.

Figure 11:
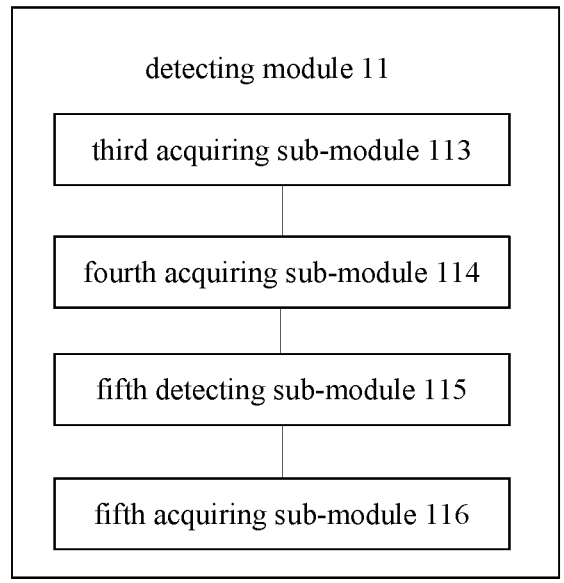
FIG. 11 is a block diagram illustrating a detecting module 11 included in a device for adjusting indoor illumination intensity according to an example.

In an example, as illustrated in FIG. 11, the detecting module 11 further includes a third acquiring sub-module 113, a fourth acquiring sub-module 114, a fifth detecting sub-module 115 and a fifth acquiring sub-module 116.

The third acquiring sub-module 113 is configured to acquire a preset adjustment table. The preset adjustment table includes a set of electric appliances susceptible to the illumination intensity and the requirements of the target illumination intensity value corresponding to the set of electric appliances.

The fourth acquiring sub-module 114 is configured to acquire indoor electric appliances placed in the room.

The fifth detecting sub-module 115 is configured to detect, in the indoor electric appliances acquired by the fourth acquiring sub-module 114, one or more candidate electric appliances that are contained in the preset adjustment table acquired by the third acquiring sub-module 113.

The fifth acquiring sub-module 116 is configured to acquire the target adjustment table according to the one or more candidate electric appliances acquired by the fifth detecting sub-module 115 and the preset adjustment table acquired by the third acquiring sub-module 113.

According to a third aspect of examples of the present disclosure, there is provided an apparatus for adjusting indoor illumination intensity. The apparatus includes a processor, and a memory configured to store instructions executable by the processor.

The processor is configured to acquire a requirement of a target illumination intensity value when a target electric appliance is running, upon detecting that the target electric appliance susceptible to illumination intensity in a room is running.

Furthermore, the processor is configured to collect a first indoor illumination intensity value.

In addition, the processor is configured to control an indoor illumination intensity adjustment device according to the first indoor illumination intensity value and the requirement of the target illumination intensity value. The indoor illumination intensity adjustment device is configured to change the first indoor illumination intensity value such that a second indoor illumination intensity value changed conforms to the requirement of the target illumination intensity value.

When the indoor illumination intensity adjustment device includes a curtain, the processor is further configured to execute the followings to realize controlling the indoor illumination intensity adjustment device according to the first indoor illumination intensity value and the requirement of the target illumination intensity value such that the second indoor illumination intensity value changed conforms to the requirement of the target illumination intensity value.

It is detected whether the first indoor illumination intensity value is greater than the target illumination intensity value.

The curtain is controlled to be closed based on a first predetermined rule when the first indoor illumination intensity value is greater than the target illumination intensity value.

During a process of closing the curtain, an adjusted indoor illumination intensity value is detected, and the curtain is controlled to remain in a current status when the adjusted indoor illumination intensity value conforms to the requirement of the target illumination intensity value. Conforming to the requirement of the target illumination intensity value is that the adjusted indoor illumination intensity value is not greater than the requirement of the target illumination intensity value.

Furthermore, the processor is further configured to execute the followings.

The curtain is controlled to be opened according to a second predetermined rule when the first indoor illumination intensity value is smaller than the target illumination intensity value.

During a process of opening the curtain, an adjusted indoor illumination intensity value is detected, and the curtain is controlled to remain in a current status when the adjusted indoor illumination intensity value conforms to the requirement of the target illumination intensity value. Conforming to the requirement of the target illumination intensity value is that the adjusted indoor illumination intensity value is not smaller than the requirement of the target illumination intensity value.

Acquiring the requirement of the target illumination intensity value when the target electric appliance is running, upon detecting that the target electric appliance susceptible to the illumination intensity in the room is running includes the followings.

One or more electric appliances running in the room are acquired.

In addition, when an electric appliance included in the one or more electric appliances running in the room is same with one of candidate electric appliances included in a target adjustment table, the electric appliance is determined as the target electric appliance. The target adjustment table includes a mapping relationship between the candidate electric appliances and requirements of target illumination intensity value when the candidate electric appliances are running.

Furthermore, the requirement of the target illumination intensity value corresponding to the target electric appliance is acquired from the target adjustment table.

The processor is further configured to execute the followings.

A preset adjustment table is acquired. The preset adjustment table includes a set of electric appliances susceptible to the illumination intensity and the requirements of target illumination intensity value corresponding to the set of electric appliances.

In addition, indoor electric appliances placed in the room are acquired.

Furthermore, one or more candidate electric appliances that are contained in the preset adjustment table are detected in the indoor electric appliances.

Moreover, the target adjustment table is acquired according to the one or more candidate electric appliances and the preset adjustment table.

With respect to the device in the foregoing examples, specific manners in which the respective modules perform the operations have been described in detail in the examples related to the method, and the detailed description will not be given here.

Figure 12:
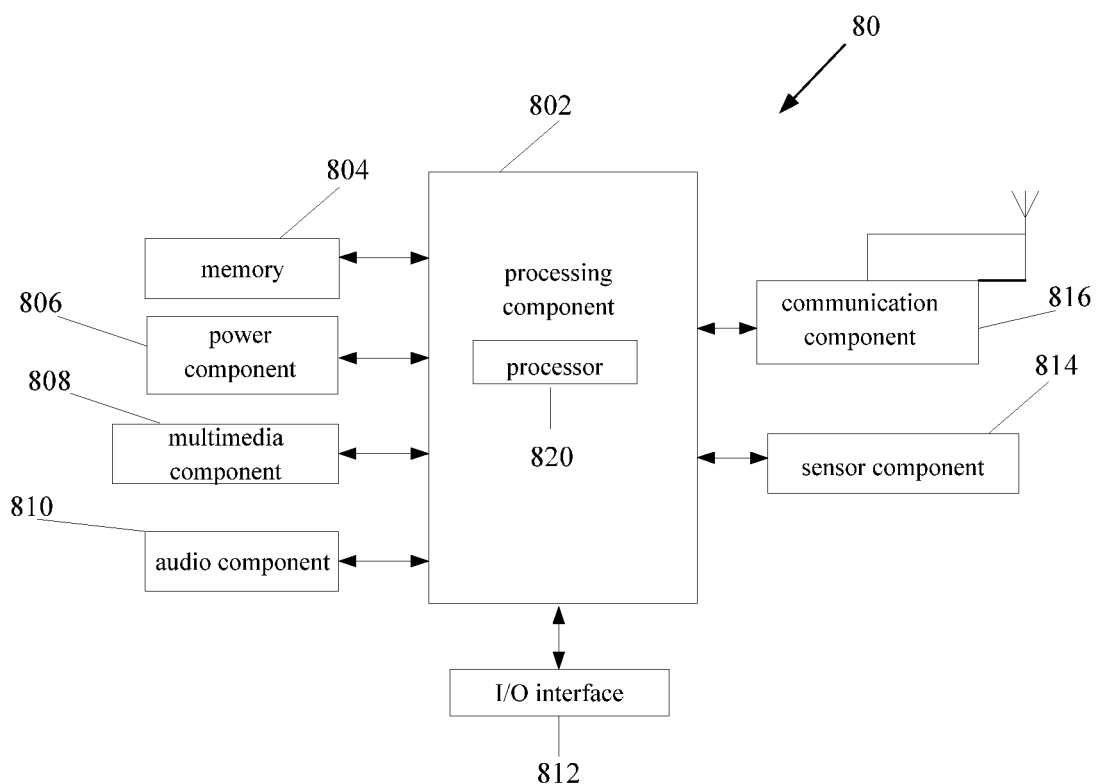
FIG. 12 is a block diagram illustrating an apparatus 80 for adjusting indoor illumination intensity according to an example.

FIG. 12 is a block diagram illustrating an apparatus 80 for adjusting indoor illumination intensity according to an example. The apparatus is applicable to a terminal device.

The apparatus 80 may include the following one or more components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 80, such as the operations associated with display, telephone calls, data communications, camera operations, and recording operations. The processing component 802 may include one or more processors 820 to execute instructions to perform all or part of the acts in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 80. Examples of such data include instructions for any applications or methods operated on the apparatus 80, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 80. The power component 806 may include a power management system, one or more power sources, and any other components associated with the generation, management, and distribution of power in the apparatus 80.

The multimedia component 808 includes a screen providing an output interface between the apparatus 80 and the user. In some examples, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some examples, the multimedia component 808 includes a front camera and/or a rear camera. The front camera and/or the rear camera may receive external multimedia data while the apparatus 80 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface for the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 80. For instance, the sensor component 814 may detect an activation/deactivation status of the apparatus 80 and relative positioning of components (e.g. the display and the keypad of the apparatus 80). The sensor component 814 may also detect a change in position of the apparatus 80 or of a component in the apparatus 80, a presence or absence of user contact with the apparatus 80, an orientation or an acceleration/deceleration of the apparatus 80, and a change in temperature of the apparatus 80. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, a microwave sensor or a temperature sensor.

The communication component 816 is configured to facilitate wired or wireless communication between the apparatus 80 and other apparatuses. The apparatus 80 can access a wireless network based on a communication standard, such as WIFI, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method In examples, there is also provided a non-transitory computer readable storage medium having instructions, such as the memory 804 including instructions. The instructions may be executed by the processors 820 of the apparatus 80 to perform the above method. For example, the non-transitory computer-readable storage medium may be a ROM, a RAM, a CD-ROM, a magnetic tape, a floppy disc, an optical data storage device, and the like.

A non-transitory computer readable storage medium is provided. When instructions in the storage medium are executed by a processor of the apparatus 80, the apparatus 80 may execute a method for adjusting indoor illumination intensity.

The method includes acquiring a requirement of a target illumination intensity value when a target electric appliance is running, upon detecting that the target electric appliance susceptible to illumination intensity in a room is running.

In addition, the method includes collecting a first indoor illumination intensity value.

Furthermore, the method includes controlling an indoor illumination intensity adjustment device according to the first indoor illumination intensity value and the requirement of the target illumination intensity value. The indoor illumination intensity adjustment device is configured to change the first indoor illumination intensity value such that a second indoor illumination intensity value changed conforms to the requirement of the target illumination intensity value.

The indoor illumination intensity adjustment device includes a curtain. Controlling the indoor illumination intensity adjustment device according to the first indoor illumination intensity value and the requirement of the target illumination intensity value such that the second indoor illumination intensity value changed conforms to the requirement of the target illumination intensity value includes the followings.

It is detected whether the first indoor illumination intensity value is greater than the target illumination intensity value.

In addition, the curtain is controlled to be closed based on a first predetermined rule when the first indoor illumination intensity value is greater than the target illumination intensity value.

Furthermore, during a process of closing the curtain, an adjusted indoor illumination intensity value is detected, and the curtain is controlled to remain in a current status when the adjusted indoor illumination intensity value conforms to the requirement of the target illumination intensity value. Conforming to the requirement of the target illumination intensity value is that the adjusted indoor illumination intensity value is not greater than the requirement of the target illumination intensity value.

The method further includes controlling to open the curtain according to a second predetermined rule when the first indoor illumination intensity value is smaller than the target illumination intensity value.

In addition, the method further includes during a process of opening the curtain, detecting an adjusted indoor illumination intensity value, and controlling the curtain to remain in a current status when the adjusted indoor illumination intensity value conforms to the requirement of the target illumination intensity value. Conforming to the requirement of the target illumination intensity value is that the adjusted indoor illumination intensity value is not smaller than the requirement of the target illumination intensity value.

Acquiring the requirement of the target illumination intensity value when the target electric appliance is running, upon detecting that the target electric appliance susceptible to the illumination intensity in the room is running includes the followings.

One or more electric appliances running in the room are acquired.

In addition, when it is detected that an electric appliance included in the one or more electric appliances running in the room is same with one of candidate electric appliances included in a target adjustment table, the electric appliance is determined as the target electric appliance. The target adjustment table may include a mapping relationship between the candidate electric appliances and target illumination intensity values when the candidate electric appliances are running.

Sometimes, when there are multiple electric appliances running in the room match the candidate electric appliances, one of them may be determined as the target electric appliance. Sometimes, the one that requires the low target illumination intensity value may be selected. Sometimes, the one that requires the high target illumination intensity value may be selected. The user may also select the target electric appliance via a user interface.

Furthermore, the requirement of the target illumination intensity value corresponding to the target electric appliance is acquired from the target adjustment table.

The method further includes acquiring a preset adjustment table. The preset adjustment table includes a set of electric appliances susceptible to the illumination intensity and the requirements of target illumination intensity value corresponding to the set of electric appliances.

In addition, the method further includes acquiring indoor electric appliances placed in the room.

Furthermore, the method includes detecting, in the indoor electric appliances, one or more candidate electric appliances that are contained in the preset adjustment table.

Moreover, the method includes acquiring the target adjustment table according to the one or more candidate electric appliances and the preset adjustment table.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It is to be understood that, the present disclosure is not limited to the exact construction that has been described above and illustrated in the accompanying drawings, and that various modifications and changes can be made without departing form the scope thereof.

What is claimed is:

1. A method for adjusting indoor illumination intensity, comprising:
    acquiring one or more electric appliances running in a room;
    obtaining a target adjustment table, wherein the target adjustment table comprises one or more candidate electric appliances, and a mapping relationship between the candidate electric appliances and requirements of target illumination intensity value when the candidate electric appliances are running;
    detecting whether a type of an electric appliance among the one or more electric appliances running in the room is same with a type of one of the candidate electric appliances comprised in the target adjustment table;
    when detecting that the type of the electric appliance among the one or more electric appliances running in the room is same with the type of one of the candidate electric appliances comprised in the target adjustment table, determining the detected electric appliance as a target electric appliance;
    acquiring, from the target adjustment table, a target illumination intensity value corresponding to the target electric appliance that is running, wherein the target electric appliance that is running is susceptible to illumination intensity in the room;
    collecting a first indoor illumination intensity value in the room;
    controlling an indoor illumination intensity adjustment device according to the first indoor illumination intensity value and the target illumination intensity value to change the first indoor illumination intensity value to achieve a second indoor illumination intensity value in the room, wherein the second indoor illumination intensity value conforms to the target illumination intensity value;
    acquiring a preset adjustment table, wherein the preset adjustment table comprises a set of electric appliances susceptible to the illumination intensity and target illumination intensity values corresponding to the electric appliances in the set;
    acquiring indoor electric appliances placed in the room;
    detecting, among the indoor electric appliances, one or more candidate susceptible electric appliances that are contained in the preset adjustment table; and
    obtaining the target adjustment table according to the one or more candidate susceptible electric appliances and the preset adjustment table.

2. The method according to claim 1, wherein the indoor illumination intensity adjustment device comprises a curtain; and controlling the indoor illumination intensity adjustment device according to the first indoor illumination intensity value and the target illumination intensity value comprises:
    detecting whether the first indoor illumination intensity value is greater than the target illumination intensity value;
    controlling to close the curtain when the first indoor illumination intensity value is greater than the target illumination intensity value; and
    while closing the curtain, detecting an adjusted indoor illumination intensity value, and controlling to stop closing the curtain when the adjusted indoor illumination intensity value is not greater than the target illumination intensity value.

3. The method according to claim 2, further comprising:
    controlling to open the curtain when the first indoor illumination intensity value is smaller than the target illumination intensity value; and
    while opening the curtain, detecting the adjusted indoor illumination intensity value, and controlling to stop opening the curtain the adjusted indoor illumination intensity value is not smaller than the target illumination intensity value.

4. An apparatus for adjusting indoor illumination intensity, comprising:
    a processor; and
    a memory, configured to store executable instructions by the processor;
    wherein the processor is configured to:
    acquire one or more electric appliances running in a room;
    obtain a target adjustment table, wherein the target adjustment table comprises one or more candidate electric appliances, and a mapping relationship between the candidate electric appliances and requirements of target illumination intensity value when the candidate electric appliances are running;
    detect whether a type of an electric appliance among the one or more electric appliances running in the room is same with a type of one of the candidate electric appliances comprised in a target adjustment table;
    when detecting that the type of the electric appliance among the one or more electric appliances running in the room is same with the type of one of the candidate electric appliances comprised in the target adjustment table, determine the detected electric appliance as a target electric appliance;
    acquire, from the target adjustment table, a target illumination intensity value corresponding to the target electric appliance that is running, wherein the target electric appliance that is running is susceptible to illumination intensity in the room;

collect a first indoor illumination intensity value in the room;

control an indoor illumination intensity adjustment device according to the first indoor illumination intensity value and the target illumination intensity value to change the first indoor illumination intensity value to achieve a second indoor illumination intensity value in the room, wherein the second indoor illumination intensity value conforms to the target illumination intensity value;

acquire a preset adjustment table, wherein the preset adjustment table comprises a set of electric appliances susceptible to the illumination intensity and target illumination intensity values corresponding to the electric appliances in the set;

acquire indoor electric appliances placed in the room;

detect, among the indoor electric appliances, one or more candidate susceptible electric appliances that are contained in the preset adjustment table; and obtain the target adjustment table according to the one or more candidate susceptible electric appliances and the preset adjustment table.

5. The apparatus according to claim 4, wherein the indoor illumination intensity adjustment device comprises a curtain, and the processor is further configured to:

detect whether the first indoor illumination intensity value is greater than the target illumination intensity value;

control to close the curtain when the first indoor illumination intensity value is greater than the target illumination intensity value; and while closing the curtain, detect an adjusted indoor illumination intensity value, and control to stop closing the curtain when the adjusted indoor illumination intensity value is not greater than the target illumination intensity value.

6. The apparatus according to claim 5, wherein the processor is further configured to:

control to open the curtain when the first indoor illumination intensity value is smaller than the target illumination intensity value; and while opening the curtain, detect the adjusted indoor illumination intensity value, and control to stop opening the curtain when the adjusted indoor illumination intensity value is not smaller than the target illumination intensity value.

7. A non-transitory computer readable storage medium, having instructions stored thereon, wherein when the instructions are executed by a processor, the instructions cause the processor to execute:

acquiring one or more electric appliances running in a room;

obtaining a target adjustment table, wherein the target adjustment table comprises one or more candidate electric appliances, and a mapping relationship between the candidate electric appliances and requirements of target illumination intensity value when the candidate electric appliances are running;

detecting whether a type of an electric appliance among the one or more electric appliances running in the room is same with a type of one of the candidate electric appliances comprised in the target adjustment table;

when detecting that the type of the electric appliance among the one or more electric appliances running in the room is same with the type of one of the candidate electric appliances comprised in the target adjustment table, determining the detected electric appliance as a target electric appliance;

acquiring, from the target adjustment table, a target illumination intensity value corresponding to the target electric appliance that is running, wherein the target electric appliance that is running is susceptible to illumination intensity in the room;

collecting a first indoor illumination intensity value in the room;

controlling an indoor illumination intensity adjustment device according to the first indoor illumination intensity value and the target illumination intensity value to change the first indoor illumination intensity value to achieve a second indoor illumination intensity value in the room, wherein the second indoor illumination intensity value conforms to the target illumination intensity value;

acquiring a preset adjustment table, wherein the preset adjustment table comprises a set of electric appliances susceptible to the illumination intensity and target illumination intensity values corresponding to the electric appliances in the set;

acquiring indoor electric appliances placed in the room;

detecting, among the indoor electric appliances, one or more candidate susceptible electric appliances that are contained in the preset adjustment table; and obtaining the target adjustment table according to the one or more candidate susceptible electric appliances and the preset adjustment table.

8. The non-transitory computer readable storage medium according to claim 7, wherein the indoor illumination intensity adjustment device comprises a curtain, and the instructions cause the processor to execute controlling the indoor illumination intensity adjustment device according to the first indoor illumination intensity value and target illumination intensity value further cause the processor to execute:

detecting whether the first indoor illumination intensity value is greater than the target illumination intensity value;

controlling to close the curtain when the first indoor illumination intensity value is greater than the target illumination intensity value; and while closing the curtain, detecting an adjusted indoor illumination intensity value, and controlling to stop closing the curtain when the adjusted indoor illumination intensity value is not greater than the target illumination intensity value.

9. The non-transitory computer readable storage medium according to claim 8, wherein the instructions further cause the processor to execute:

controlling to open the curtain when the first indoor illumination intensity value is smaller than the target illumination intensity value; and while opening the curtain, detecting the adjusted indoor illumination intensity value, and controlling to stop opening the curtain when the adjusted indoor illumination intensity value is not smaller than the target illumination intensity value.

\* \* \* \* \*